April 22, 1941.  R. R. HAUSE  2,239,321
OIL WELL PUMP VALVE AND METHOD OF MAKING THE SAME
Filed May 13, 1938
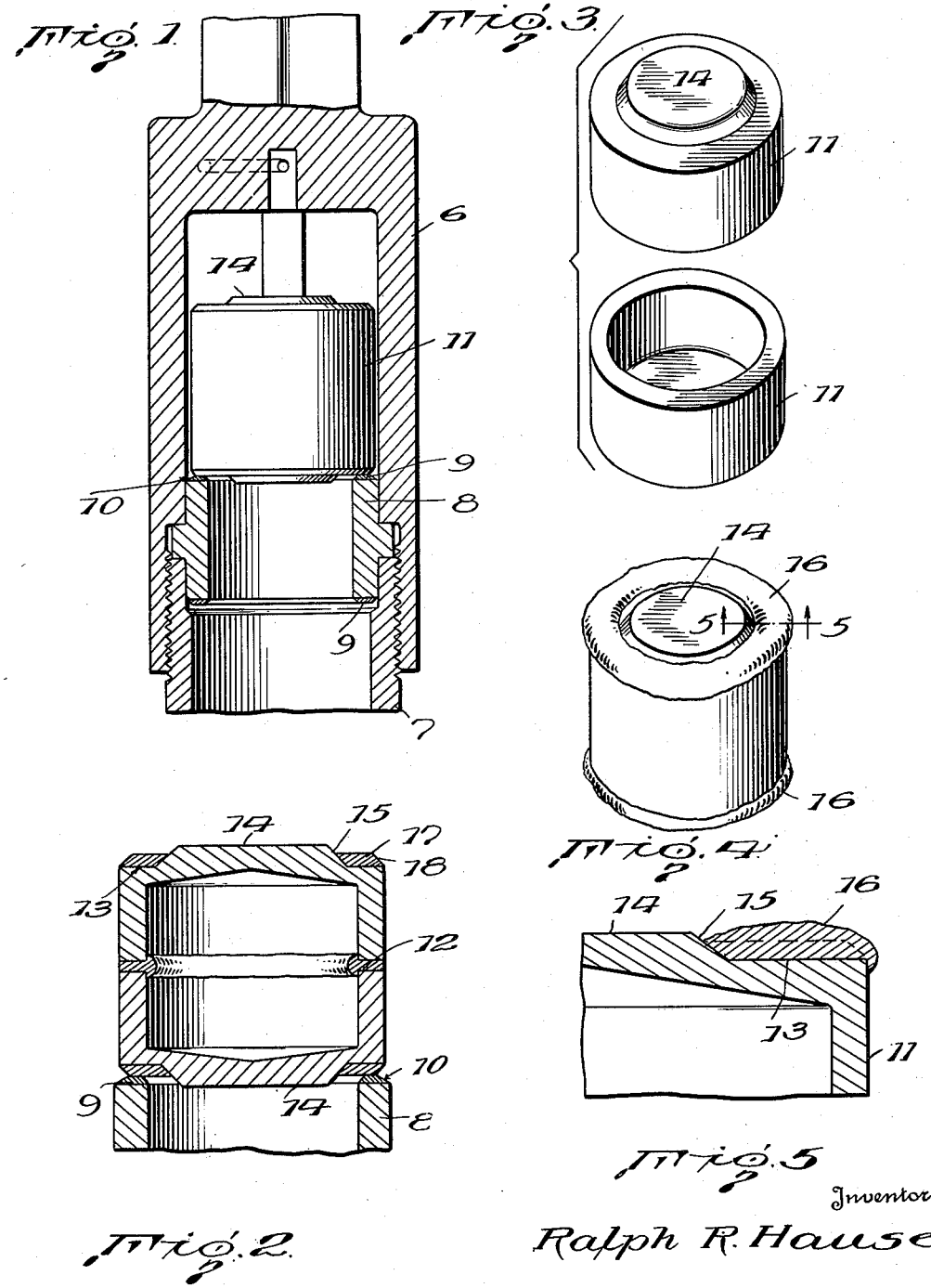
Inventor
Ralph R. Hause
By Bernard J. Sawley
Attorney Patented Apr. 22, 1941

2,239,321

UNITED STATES PATENT OFFICE 2,239,321

OIL WELL PUMP VALVE AND METHOD OF MAKING THE SAME

Ralph E. Hause, Montpelier, Ohio

Application May 13, 1938, Serial No. 207,836

6 Claims. (Cl. 29—157.1)

The present invention consists of an oil well pump valve and method of making the same, this application being a continuation in part of my previous application, Serial No. 56,364, filed December 27, 1935.

To those skilled in the art of oil well apparatus, it is well known that the pump valves are subjected to unusual and very severe treatment during the operation of the pump. It is necessary that the valve be extremely rugged to stand up for any appreciable period of time, but it is also desirable that the valve be as light as possible and a certain buoyance maintained therein. It is likewise desirable that the bore of the valve seat be of maximum diameter to permit the passage of a maximum volume of fluids therethrough. Where a seat of large internal diameter is employed, increasing difficulties have resulted in producing a valve capable of withstanding the stresses and strains necessarily imposed thereupon over a protracted period. Such conditions as valve breakage, chipping, locking, spinning, etc., have necessitated the elimination of many types of valves. The present invention was conceived with a full knowledge of the above and numerous other difficulties attendant the use of oil well pump valves, and it was only after exhaustive tests, under actual working conditions, that the new and useful valve herein shown and described was conceived.

Some of the more salient objects of the present invention are to provide a hollow relatively light valve of uniform wall diameter to augment uniform heat treatment, which valves of the present invention are subjected to; to provide a cylindrical valve, the diameter of which is slightly less than the inner diameter of the valve cage, permitting freedom of movement of the valve, but preventing canting of the latter; to provide a cylindrical hollow valve having a symmetrical periphery free from protuberances, recesses or undulations of any kind, the marginal edges of the terminals of which are beveled inwardly to provide receded seating portions on the opposite terminals of the valve to prevent the possibility of chipping and to likewise cut down resistance; to provide a method of making a valve which consists in uniting the open ends of a pair of cup members, the periphery of the cups when joined together being smooth and uninterrupted and the closed terminals of the cups equipped with bumper bosses; to provide a valve seat engaging annulus on each end of the valve, around the boss, which is faced with a wear resistant hard surface material; and to provide a method of making a valve, as herein set out, involving simple machine and welding operations to reduce the cost of manufacture to a minimum.

Other objects will be apparent to those skilled in the art from a consideration of the present preferred form of the invention, wherein:

Fig. 1 is a side elevational view of a valve constructed in accordance with the present invention, illustrating its application in a pump assembly, showing a portion of a valve cage, a valve seat and pump barrel, Fig. 2 is a vertical sectional view of the valve constructed in accordance with the present invention, illustrating the manner of mounting the same on a valve seat, the latter being shown fragmentarily, Fig. 3 is a perspective view of a pair of cups, such as are employed to make up a complete valve, Fig. 4 is a perspective view of a valve constructed in accordance with the present invention showing the same after a hard surfaced material has been fused on the ends thereof, before the excess has been machined off, and Fig. 5 is a detail enlarged fragmentary sectional view taken on the line 5—5 of Fig. 4, looking in the direction of the arrows.

In the drawing, in order to illustrate the application of my invention, I have shown a portion of a pump valve cage 6 which clamps therebetween and the top of the pump barrel 7, a valve seat member 8. The cage, barrel and seat are of conventional design, except that in the present invention the valve engaging terminals of the seat are hard faced, as indicated at 9, the margins thereof being tapered or beveled, as shown at 10, to provide seating terminals which lie within the vertical plane of the peripheral walls of the valve seat.

The valve or drop of the present invention preferably consists of twin cups 11, the open ends of which are adapted to be united, as indicated at 12, preferably by a welding operation. During this operation the excess welding material is permitted to flow into the interior of the cups at the jointure, as shown in Fig. 2. After the welding operation the outer periphery of the valve is machined to provide a smooth uninterrupted surface.

The next step in the method of forming the valve of the present invention, is to remove an annular marginal portion from each of the closed ends of the valve providing a circular table 13. By this same operation a flat concentric bumper boss 14 is formed on each of said ends, the wall 15 of each boss preferably tapering to the annular table 13. Next I cover each boss and table with a protective coating of aluminum or the like, pursuant to which the aluminum is removed from the table and a hard surface material 16 fused to the latter. I have found that a fusible alloy such as Haynes Stellite is useful for this purpose, especially where in addition to heating the table, preparatory to the fusing operation, suitable means is employed to increase the carbon content of the metal which augments and facilitates the fusion, because of the increased tendency of the molten alloy to spread rather than to form spherical nodules. The excess of the fused material 16, such as shown in Figs. 4 and 5, is then removed to a point approximately as shown in Fig. 2 and the facing 17 machined and polished to a mirror finish. The margins are beveled, as indicated at 18, to prevent extraneous materials from being trapped between the valve and its seat and likewise preventing chipping or breaking off of the margins and insuring more accurate and uniform engagement of the valve.

I have also found, after experiment, that it is possible to cast a hard surface material to the terminals of the valve seat and the terminals of the valve or drop. In using this method, it is unnecessary to first apply a protective coating to the terminals preparatory to applying the hard surface material, because the valve seat and valve or drop are mounted in molds during the casting operation which confines the flow of the hard surfacing materials. Before the casting material is poured into the mold, the valve seat and valve or drop are preheated to insure uniform application of the hard surfacing materials over the terminal walls.

Preferably, the cups 11 are made from bar metal which is bored out, leaving the walls of sufficient thickness to withstand any strain placed thereon in a normal manner and likewise providing an ample welding surface at the open ends of the cups. Preferably, the cups are made of steel or non-ferrous material and after being united may be subjected to heat treatment for tempering.

It is of importance in the present invention that the valve be hollow to decrease its weight and cylindrical to prevent spinning of the valve. It is likewise important that the ends of the valve be of identical construction to permit the valve to be reversed. By providing the bumper bosses 14 contact of the valve body proper with the crown of the cage is prevented and impacts are absorbed by the bosses to reduce wear and tear on the valve body to a minimum. It is also important to bevel the margins of the valve terminals, some of the reasons for which have already been set out. In addition, by beveling the terminal margins of the valve, the seating portions on the opposite end of the valve complement the engaging terminal of the seat 8, as shown to advantage in Fig. 1. Snug engagement of the valve in its seat is in this way effected with possibility of chipping or fissuring either the valve or valve seat reduced to a minimum.

Various changes may be made herein within the scope of the claims hereto appended.

What is claimed is:

1. The method of making an integral heat treated, hermetically sealed hollow cylindrical valve drop for oil well pumps and the like, consisting in initially forming two complemental duplicate cylindrical cup members having side and end walls of substantially uniform thickness throughout and the closed ends of the members each having an external raised flat central bumper face of substantial area and receded flat annular marginal seating surface surrounding said bumper face, placing the cup members with their open ends in abutting relation to each other and uniting them by an annular weld, and then heat treating the united assembly.

2. An integral heat treated, hermetically sealed, hollow cylindrical valve drop for oil well pumps and the like, comprising, two complemental duplicate cylindrical cup members having side and end walls of substantially uniform thickness throughout, with their open ends abutting and joined by an annular weld, the opposite closed ends of the cup members having external annular flat marginal seating faces and being embossed centrally so as to provide a raised flat bumper face of substantial area surrounded by said annular seating face.

3. The method of making an integral heat treated, hermetically sealed hollow cylindrical valve drop for oil well pumps and the like, consisting in initially forming two cylindrical cup members having side and end walls of substantially uniform thickness throughout and the closed ends of the members each having an external raised central bumper face of substantial area and receded annular marginal seating surface surrounding said bumper face, placing the cup members with their open ends in abutting relation to each other and uniting them by an annular weld, and then heat treating the united assembly.

4. An integral heat treated, hermetically sealed, hollow cylindrical valve drop for oil well pumps and the like, comprising cylindrical cup members having side and end walls of substantially uniform thickness throughout, with their open ends abutting and joined by an annular weld, the opposite closed ends of the cup members having external annular marginal seating faces and being embossed centrally so as to provide a raised bumper face of substantial area surrounded by said annular seating face.

5. A valve for oil well pumps including a hollow cylinder the ends of which are closed, and a flat faced boss issuing concentrically from each of said closed ends.

6. A method of making valves for oil well pumps which consists in uniting a pair of cylindrical cups at their open ends, removing a marginal portion of the closed end of each cup, to provide a marginal seat, and applying a protective coating to each closed end followed by removal of the coating from the seat and welding a hard surface material to the latter.

RALPH R. HAUSE.